US012632299B2

(12) United States Patent
Khoun et al.

(10) Patent No.: US 12,632,299 B2
(45) Date of Patent: May 19, 2026

(54) INSTRUCTION MERGING AND INDUCTION VARIABLE REPLACEMENT

(71) Applicant: International Business Machines Corporation, Armonk, NY (US)

(72) Inventors: Nicole Khoun, Whitby (CA); Wei Wang, Yorktown Heights, NY (US); Prasanth Chatarasi, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 502 days.

(21) Appl. No.: 18/344,345

(22) Filed: Jun. 29, 2023

(65) Prior Publication Data
US 2025/0004838 A1     Jan. 2, 2025

(51) Int. Cl.
*G06F 8/41*          (2018.01)
*G06F 9/50*          (2006.01)

(52) U.S. Cl.
CPC .................................. *G06F 9/5016* (2013.01)

(58) Field of Classification Search
None
See application file for complete search history.

(56) References Cited

U.S. PATENT DOCUMENTS 5,522,074 A     5/1996  Endo
5,537,620 A     7/1996  Breternitz 5,812,850 A  *  9/1998  Wimble .............. G06F 11/3624
                                                714/E11.209
5,903,761 A     5/1999  Tyma
6,151,705 A  * 11/2000  Santhanam ............. G06F 8/443
                                                712/E9.042

(Continued)

FOREIGN PATENT DOCUMENTS

JP          2801193  B2     9/1998

OTHER PUBLICATIONS

Unknown, "Induction Variable Recognition and Substitution", Induction Variable Recognition and Substitution—Chapter 7. Optimization and Analysis Passes, Purdue, pp. 1, accessed Jun. 28, 2023, https://engineering.purdue.edu/Cetus/Documentation/manual/ch07s02.html.

(Continued)

*Primary Examiner* — Mustafa A Amin
(74) *Attorney, Agent, or Firm* — Yee & Associates, P.C.

(57)                   ABSTRACT
Induction variable replacement (IVR) reduces operations in program loops. An IVR candidate is identified in a loop comprising linearly chained operations. The IVR candidate is derived from a basic induction variable (IV). A composite memory operation proceeding the IVR candidate is converted to unified form. Offset and increment information are separated from the composite memory operation. Constant values of the IVR candidate and a proceeding add operation are swapped. The composite memory operation is converted with an increment accommodating the preceding add operation. The add operation proceeding the composite memory operation is moved to the bottom of the series of operations. The basic IV is replaced with the IVR candidate, and the yield value of the loop is updated. The calculation for the basic IV is moved out of the loop, and the result value of the loop is adjusted to maintain the same behavior.

20 Claims, 8 Drawing Sheets

700

702 — FOR EACH IVR CANDIDATE

704 — CONVERT COMPOSITE OPERATION PROCEEDING IVR CANDIDATE TO UNIFIED FORM

706 — SWAP THE CONSTANT VALUES OF THE IVR CANDIDATE AND THE PROCEEDING ADD

708 — CONVERT THE COMPOSITE MEMORY OPERATION IN UNIFIED FORM TO A COMPOSITE MEMORY OPERATION WITH AN INCREMENT ACCOMMODATING THE PRECEDING ADD OPERATION

710 — USE INSTRUCTION MERGING WITH A TOP-DOWN MERGING THROUGH APPROACH TO MOVE THE ADD PROCEEDING THE COMPOSITE MEMORY OPERATION MODIFIED IN THE PREVIOUS STEP

712 — SUBSTITUTE THE BASIC IV THE IVR CANDIDATE IS DERIVED FROM WITH THE MODIFIED DERIVED IV

714 — ADJUST THE YIELDING RESULT OF THE LOOP

716 — MOVE THE CALCULATION FOR THE REPLACED BASIC IV OUT OF THE LOOP

718 — ADJUST THE RESULT VALUE RETURNED FROM THE LOOP

IVR COMPLETE

(56)                    References Cited

U.S. PATENT DOCUMENTS

| | | | | |
|---|---|---|---|---|
| 6,286,135 | B1 * | 9/2001 | Santhanam | G06F 8/443 |
| | | | | 717/146 |
| 6,675,376 | B2 | 1/2004 | Ronen et al. | |
| 7,398,372 | B2 | 7/2008 | Samra et al. | |
| 7,493,609 | B2 * | 2/2009 | Tal | G06F 8/445 |
| | | | | 717/160 |
| 8,296,750 | B2 | 10/2012 | Kawahito | |
| 9,015,690 | B2 | 4/2015 | Ye et al. | |
| 9,513,915 | B2 | 12/2016 | Gschwind et al. | |
| 9,798,527 | B1 | 10/2017 | Bendersky et al. | |
| 10,324,724 | B2 | 6/2019 | Lai et al. | |
| 11,163,571 | B1 | 11/2021 | Barrick et al. | |
| 2003/0005419 | A1 * | 1/2003 | Pieper | G06F 8/4442 |
| | | | | 717/141 |
| 2003/0028860 | A1 * | 2/2003 | Sumida | G06F 11/3628 |
| | | | | 714/E11.21 |
| 2004/0139429 | A1 | 7/2004 | Ronen et al. | |
| 2006/0048115 | A1 * | 3/2006 | Tal | G06F 8/445 |
| | | | | 717/151 |
| 2016/0110176 | A1 * | 4/2016 | Fink | G06F 8/456 |
| | | | | 717/137 |
| 2019/0278575 | A1 * | 9/2019 | Tiotto | G06F 8/452 |
| 2024/0354081 | A1 * | 10/2024 | Mahjour | G06F 8/443 |

OTHER PUBLICATIONS

Unknown, LLVM Compiler Infrastructure, "LLVM's Analysis and Transform Passes", pp. 1-20, accessed Jun. 28, 2023, https://llvm.org/docs/Passes.html#instcombine-combine-redundant-instructions.

Weber et al., "Induction Variable Optimizations", The CS 6120 Course Blog, Oct. 23, 2019, pp. 1-8, accessed Jun. 28, 2023, https://www.cs.cornell.edu/courses/cs6120/2019fa/blog/ive/.

* cited by examiner

COMPUTING ENVIRONMENT
100

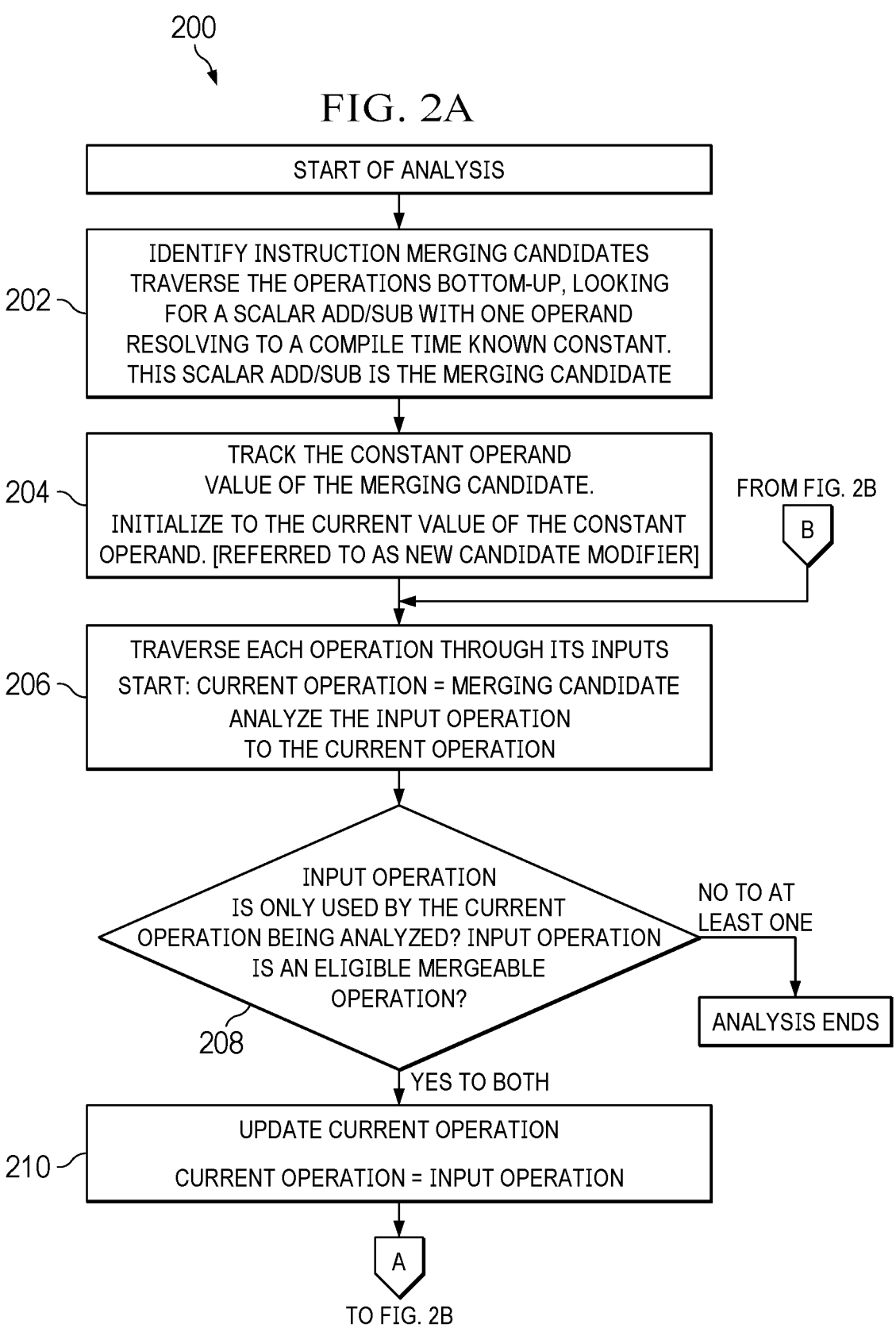

START OF ANALYSIS

202 — IDENTIFY INSTRUCTION MERGING CANDIDATES
TRAVERSE THE OPERATIONS BOTTOM-UP, LOOKING
FOR A SCALAR ADD/SUB WITH ONE OPERAND
RESOLVING TO A COMPILE TIME KNOWN CONSTANT.
THIS SCALAR ADD/SUB IS THE MERGING CANDIDATE

204 — TRACK THE CONSTANT OPERAND
VALUE OF THE MERGING CANDIDATE.

INITIALIZE TO THE CURRENT VALUE OF THE CONSTANT
OPERAND. [REFERRED TO AS NEW CANDIDATE MODIFIER]

FROM FIG. 2B

B

206 — TRAVERSE EACH OPERATION THROUGH ITS INPUTS
START: CURRENT OPERATION = MERGING CANDIDATE
ANALYZE THE INPUT OPERATION
TO THE CURRENT OPERATION

INPUT OPERATION
IS ONLY USED BY THE CURRENT
OPERATION BEING ANALYZED? INPUT OPERATION
IS AN ELIGIBLE MERGEABLE
OPERATION?

208

NO TO AT
LEAST ONE

ANALYSIS ENDS

YES TO BOTH

210 — UPDATE CURRENT OPERATION

CURRENT OPERATION = INPUT OPERATION

402 — STARTING WITH THE LAST SCALAR ADD/SUB IN THE LINEARLY CHAINED SERIES OF ELIGIBLE INSTRUCTIONS

404 — MERGE THE SCALAR ADD/SUB THROUGH ITS PRECEDING INSTRUCTION

MERGED THROUGH FIRST [TOP] INSTRUCTION IN THE LINEARLY CHAINED SERIES OF ELIGIBLE INSTRUCTIONS?

406

NO

YES

INSTRUCTION MERGING COMPLETE

700

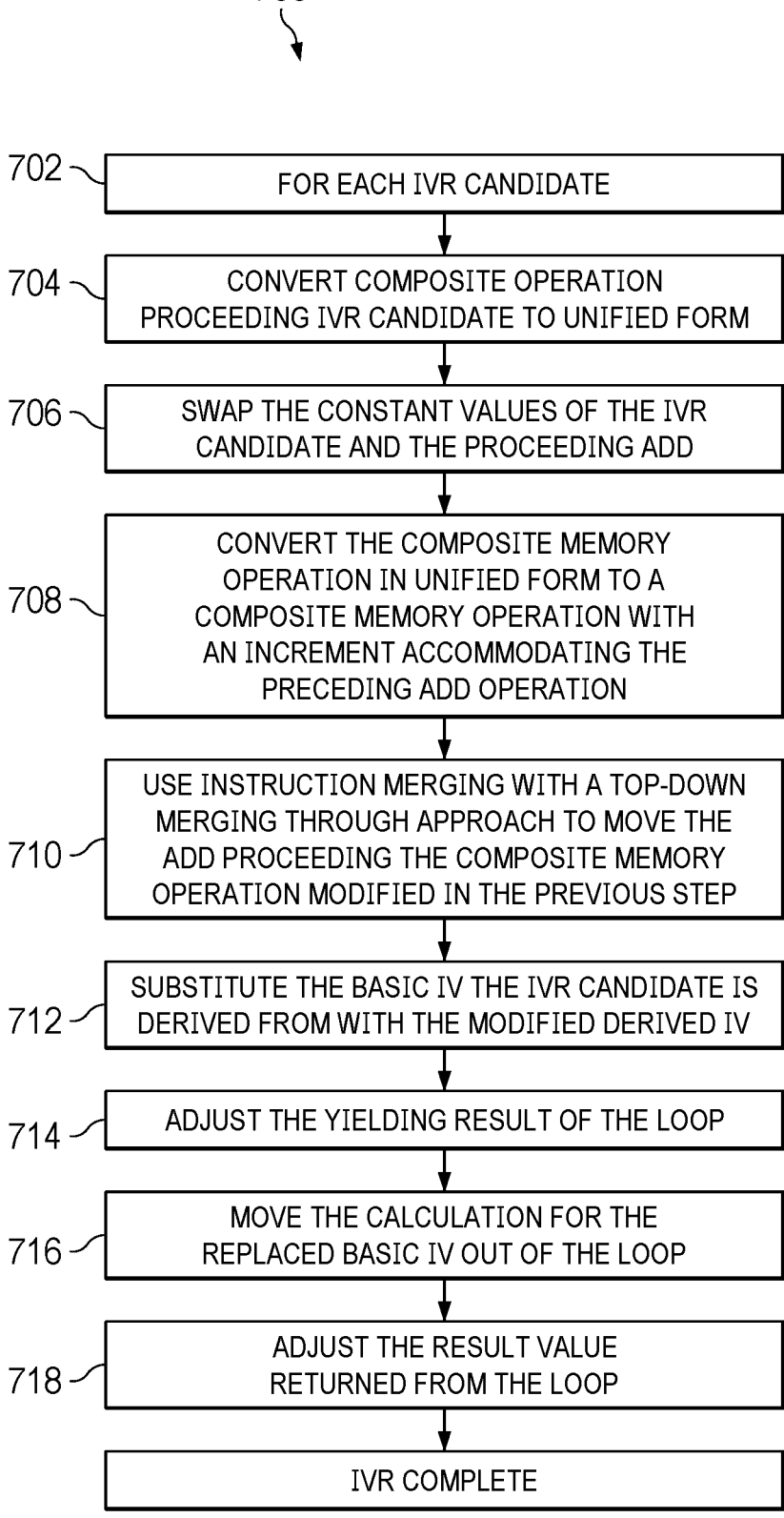

702 — FOR EACH IVR CANDIDATE

704 — CONVERT COMPOSITE OPERATION PROCEEDING IVR CANDIDATE TO UNIFIED FORM

706 — SWAP THE CONSTANT VALUES OF THE IVR CANDIDATE AND THE PROCEEDING ADD

708 — CONVERT THE COMPOSITE MEMORY OPERATION IN UNIFIED FORM TO A COMPOSITE MEMORY OPERATION WITH AN INCREMENT ACCOMMODATING THE PRECEDING ADD OPERATION

710 — USE INSTRUCTION MERGING WITH A TOP-DOWN MERGING THROUGH APPROACH TO MOVE THE ADD PROCEEDING THE COMPOSITE MEMORY OPERATION MODIFIED IN THE PREVIOUS STEP

712 — SUBSTITUTE THE BASIC IV THE IVR CANDIDATE IS DERIVED FROM WITH THE MODIFIED DERIVED IV

714 — ADJUST THE YIELDING RESULT OF THE LOOP

716 — MOVE THE CALCULATION FOR THE REPLACED BASIC IV OUT OF THE LOOP

718 — ADJUST THE RESULT VALUE RETURNED FROM THE LOOP

IVR COMPLETE

FIG. 7

INSTRUCTION MERGING AND INDUCTION VARIABLE REPLACEMENT

BACKGROUND

The present disclosure relates generally to an improved computing system, and more specifically to eliminating address arithmetic operations using composite operations.

Composite memory operations are memory operations that include address manipulation along with the data access. Composite memory operations can realize multiple standard addressing modes in traditional computer architectures. By combining multiple operations into a composite operation, a computer system can process data efficiently, especially when dealing with large datasets or complete computations.

SUMMARY

According to one illustrative embodiment, a computer-implement method performs induction variable replacement (IVR). A number of processors to perform identify an IVR candidate in a program loop comprising a linearly chained series of eligible operations. The IVR candidate is derived from a basic induction variable in the program loop. The number of processors convert a composite memory operation proceeding the IVR candidate in the program loop to unified form. Offset and increment information are separated from the composite memory operation. The number of processors swap constant values of the IVR candidate and a proceeding add operation in the program loop. The number of processors convert the composite memory operation in unified form to a composite memory operation with an increment accommodating the add operation preceding the composite memory operation. The number of processors move the add operation proceeding the composite memory operation to the bottom of the linearly chained series of eligible operations via instruction merging. The number of processors substitute the basic induction variable with the IVR candidate and update a yield value of the program loop according to a new control flow resulting from the substitution of the IVR candidate for the basic induction variable. The number of processors move a calculation for the basic induction variable out of the program loop and adjust a result value returned from the program loop such that the result maintains the same behavior prior to the IVR. According to other illustrative embodiments, a computer system and a computer program product for IVR are provided.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 2A depicts a flowchart of a process of analyzing candidates for instruction merging in accordance with an illustrative embodiment;

FIG. 7 depicts a flowchart of a process for induction variable replacement in accordance with an illustrative embodiment.

DETAILED DESCRIPTION

Figure 1:
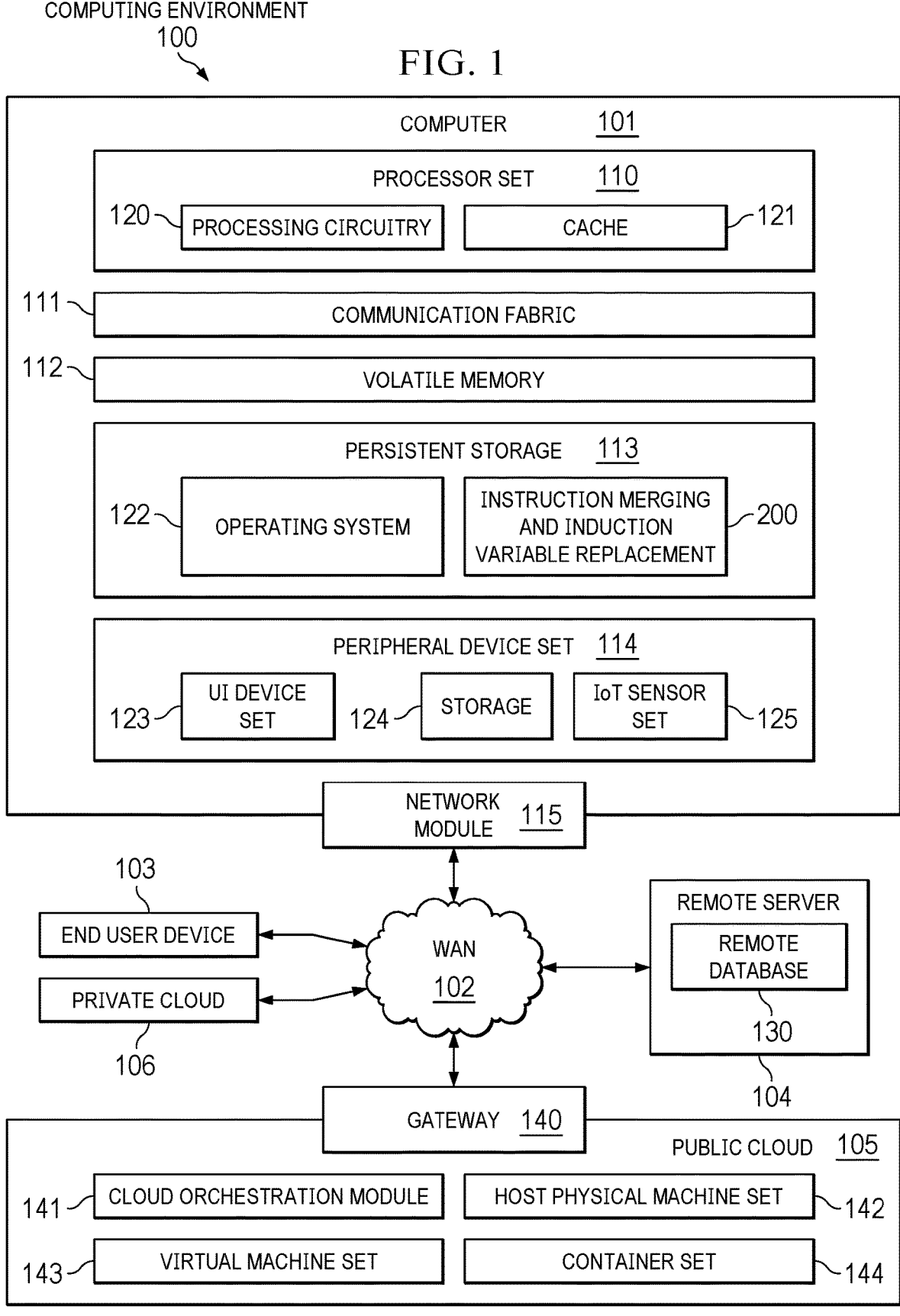
FIG. 1 depicts a pictorial representation of a computing environment in which illustrative embodiments may be implemented.

A computer-implemented method performs induction variable replacement (IVR). A number of processors to perform identify an IVR candidate in a program loop comprising a linearly chained series of eligible operations. The IVR candidate is derived from a basic induction variable in the program loop. The number of processors convert a composite memory operation proceeding the IVR candidate in the program loop to unified form. Offset and increment information are separated from the composite memory operation. The number of processors swap constant values of the IVR candidate and a proceeding add operation in the program loop. The number of processors convert the composite memory operation in unified form to a composite memory operation with an increment accommodating the add operation preceding the composite memory operation. The number of processors move the add operation proceeding the composite memory operation to the bottom of the linearly chained series of eligible operations via instruction merging. The number of processors substitute the basic induction variable with the IVR candidate and update a yield value of the program loop according to a new control flow resulting from the substitution of the IVR candidate for the basic induction variable. The number of processors move a calculation for the basic induction variable out of the program loop and adjust a result value returned from the program loop such that the result maintains the same behavior prior to the IVR. As a result, the illustrative embodiments provide a technical effect of reducing the number of operations found in program loops.

As part of identifying the IVR candidate in the program loop the number of processors identify the basic induction variable in the program loop and determine whether the basic induction variable is used by a derived induction variable comprises a scalar add/sub operation in the program loop with a constant operand. Responsive to a determination that the basic induction variable is used by a derived induction variable, the number of processors determine whether the derived induction variable is used by a composite memory operation eligible for instruction merging. Responsive to a determination that the derived induction variable is used by a composite memory operation eligible for instruction merging, the number of processors identify the derived induction variable as an IVR candidate. As a result, the illustrative embodiments provide a technical effect of identifying IVR candidate operations in a program loop.

As part of moving the add operation to the bottom of the linearly chained series of eligible operations, the number of processors merge the first scalar add/sub operation in the linearly chained series of eligible operations through its proceeding instruction and repeat the merging until the first scalar add/sub operation is merged through the bottom instruction in the linearly chain series of eligible operations. As a result, the illustrative embodiments provide a technical effect of merging instructions in a program loop from the top of a chain of instructions to the bottom.

As part of substituting the basic induction variable with the IVR candidate the number of processors manipulate the IVR candidate to produce an equivalent equation to the basic induction variable. The number of processors replace the basic induction variable with the IVR candidate according to the manipulation and shift constants to the right side of the equation. As a result, the illustrative embodiments provide a technical effect of replacing the basic induction variable with the IVR candidate to reduce the number of operations in the program loop.

Prior to IVR the number of processors can execute bottom-up instruction merging of the program loop. The number of processors merge the bottom scalar add/sub operation in the linearly chained series of eligible operations through its preceding instruction and repeat the merging until the last scalar add/sub operation is merged through the top instruction in the linearly chain series of eligible operations. As a result, the illustrative embodiments provide a technical effect of merging instructions in a program loop from the bottom of a chain of instructions to the top.

A series of instructions are eligible for instruction merging given the series contains composite memory operations with an offset containing constant values, scalar add/sub operations that have one constant operand, and all the instructions in the series form a linearly chained series of instructions. As result, the illustrative embodiments provide the technical effect of merging instructions that are properly chained together.

As part of IVR the number of processors transform an operation in the linearly chained series of eligible operations. Responsive to a determination that the operation is a composite memory operation, the number of processors set the offset of the composite memory operation to a new offset equal to the offset minus an increment value minus a current value of a constant operand. Responsive to a determination that the operation is a scalar add/sub operation, the number of processors remove the operation from the chained series of eligible operations. The number of processors insert a new add operation before the first operation in the linearly chained series of eligible operations. As a result, the illustrative embodiments provide a technical effect of transforming operation to work within the new control flow produced by IVR.

A computer system comprises a storage device that stores program instructions and one or more processors operably connected to the storage device and configured to execute the program instructions to cause the system to identify an IVR candidate in a program loop comprising a linearly chained series of eligible operations, wherein the IVR candidate is derived from a basic induction variable in the program loop; convert a composite memory operation proceeding the IVR candidate in the program loop to unified form, wherein offset and increment information are separated from the composite memory operation; swap constant values of the IVR candidate and a proceeding add operation in the program loop; convert the composite memory operation in unified form to a composite memory operation with an increment accommodating the add operation preceding the composite memory operation; move the add operation proceeding the composite memory operation to the bottom of the linearly chained series of eligible operations via instruction merging; substitute the basic induction variable with the IVR candidate; update a yield value of the program loop according to a new control flow resulting from the substitution of the IVR candidate for the basic induction variable; move a calculation for the basic induction variable out of the program loop; and adjust a result value returned from the program loop such that the result maintains the same behavior prior to the IVR. As a result, the illustrative embodiments provide a technical effect of reducing the number of operations found in program loops.

As part of identifying the IVR candidate in the program loop the processors execute program instructions to identify the basic induction variable in the program loop; determine whether the basic induction variable is used by a derived induction variable comprises a scalar add/sub operation in the program loop with a constant operand; responsive to a determination that the basic induction variable is used by a derived induction variable, determine whether the derived induction variable is used by a composite memory operation eligible for instruction merging; and responsive to a determination that the derived induction variable is used by a composite memory operation eligible for instruction merging, identify the derived induction variable as an IVR candidate. As a result, the illustrative embodiments provide a technical effect of identifying IVR candidate operations in a program loop.

As part of moving the add operation to the bottom of the linearly chained series of eligible operations the processors execute program instructions to merge the first scalar add/sub operation in the linearly chained series of eligible operations through its proceeding instruction and repeat the merging until the first scalar add/sub operation is merged through the bottom instruction in the linearly chain series of eligible operations. As a result, the illustrative embodiments provide a technical effect of merging instructions in a program loop from the top of a chain of instructions to the bottom.

As part of substituting the basic induction variable with the IVR candidate the processors execute program instructions to manipulate the IVR candidate to produce an equivalent equation to the basic induction variable; replace the basic induction variable with the IVR candidate according to the manipulation; and shift constants to the right side of the equation. As a result, the illustrative embodiments provide a technical effect of replacing the basic induction variable with the IVR candidate to reduce the number of operations in the program loop.

Prior to IVR the number of processors execute program instructions for bottom-up instruction merging of the program loop. The processors execute program instructions to merge the bottom scalar add/sub operation in the linearly chained series of eligible operations through its preceding instruction and repeat the merging until the last scalar add/sub operation is merged through the top instruction in the linearly chain series of eligible operations. As a result, the illustrative embodiments provide a technical effect of merging instructions in a program loop from the bottom of a chain of instructions to the top.

As part of IVR the program instructions cause the processors to transform an operation in the linearly chained series of eligible operations. The program instructions cause the processors to, responsive to a determination that the operation is a composite memory operation, set the offset of the composite memory operation to a new offset equal to the offset minus an increment value minus a current value of a constant operand; responsive to a determination that the operation is a scalar add/sub operation, remove the operation from the chained series of eligible operations; and insert a new add operation before the first operation in the linearly chained series of eligible operations. As a result, the illustrative embodiments provide a technical effect of transforming operation to work within the new control flow produced by IVR.

A computer program product performs induction variable replacement (IVR). Persistent storage medium has program instructions configured to cause one or more processors to identify an IVR candidate in a program loop comprising a linearly chained series of eligible operations, wherein the IVR candidate is derived from a basic induction variable in the program loop; convert a composite memory operation proceeding the IVR candidate in the program loop to unified form, wherein offset and increment information are separated from the composite memory operation; swap constant values of the IVR candidate and a proceeding add operation in the program loop; convert the composite memory operation in unified form to a composite memory operation with an increment accommodating the add operation preceding the composite memory operation; move the add operation proceeding the composite memory operation to the bottom of the linearly chained series of eligible operations via instruction merging; substitute the basic induction variable with the IVR candidate; update a yield value of the program loop according to a new control flow resulting from the substitution of the IVR candidate for the basic induction variable; move a calculation for the basic induction variable out of the program loop; and adjust a result value returned from the program loop such that the result maintains the same behavior prior to the IVR. As a result, the illustrative embodiments provide a technical effect of reducing the number of operations found in program loops.

As part of identifying the IVR candidate in the program loop the program instructions cause the processors to identify the basic induction variable in the program loop; determine whether the basic induction variable is used by a derived induction variable comprises a scalar add/sub operation in the program loop with a constant operand; responsive to a determination that the basic induction variable is used by a derived induction variable, determine whether the derived induction variable is used by a composite memory operation eligible for instruction merging; and responsive to a determination that the derived induction variable is used by a composite memory operation eligible for instruction merging, identify the derived induction variable as an IVR candidate. As a result, the illustrative embodiments provide a technical effect of identifying IVR candidate operations in a program loop.

As part of moving the add operation to the bottom of the linearly chained series of eligible operations the program instructions cause the processors to execute program instructions to merge the first scalar add/sub operation in the linearly chained series of eligible operations through its proceeding instruction and repeat the merging until the first scalar add/sub operation is merged through the bottom instruction in the linearly chain series of eligible operations. As a result, the illustrative embodiments provide a technical effect of merging instructions in a program loop from the top of a chain of instructions to the bottom.

As part of substituting the basic induction variable with the IVR candidate the program instructions cause the processors to manipulate the IVR candidate to produce an equivalent equation to the basic induction variable; replace the basic induction variable with the IVR candidate according to the manipulation; and shift constants to the right side of the equation. As a result, the illustrative embodiments provide a technical effect of replacing the basic induction variable with the IVR candidate to reduce the number of operations in the program loop.

Prior to IVR the program instructions cause the processors to perform bottom-up instruction merging of the program loop. The program instructions cause the processors to merge the bottom scalar add/sub operation in the linearly chained series of eligible operations through its preceding instruction and repeat the merging until the last scalar add/sub operation is merged through the top instruction in the linearly chain series of eligible operations. As a result, the illustrative embodiments provide a technical effect of merging instructions in a program loop from the bottom of a chain of instructions to the top.

A series of instructions are eligible for instruction merging given the series contains composite memory operations with an offset containing constant values, scalar add/sub operations that have one constant operand, and all the instructions in the series form a linearly chained series of instructions. As a result, the illustrative embodiments provide the technical effect of merging instructions that are properly chained together.

As part of IVR the program instructions cause the processors to transform an operation in the linearly chained series of eligible operations. The program instructions cause the processors to, responsive to a determination that the operation is a composite memory operation, set the offset of the composite memory operation to a new offset equal to the offset minus an increment value minus a current value of a constant operand; responsive to a determination that the operation is a scalar add/sub operation, remove the operation from the chained series of eligible operations; and insert a new add operation before the first operation in the linearly chained series of eligible operations. As a result, the illustrative embodiments provide a technical effect of transforming operation to work within the new control flow produced by IVR.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium May be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to the figures, and in particular, with reference to FIG. 1, a diagram of a data processing environment is provided in which illustrative embodiments may be implemented. It should be appreciated that FIG. 1 is only meant as an example and are not intended to assert or imply any limitation with regard to the environments in which different embodiments may be implemented. Many modifications to the depicted environment may be made.

FIG. 1 depicts a pictorial representation of a computing environment in which illustrative embodiments may be implemented. Computing environment 100 contains an example of an environment for the execution of at least some of the computer code involved in performing the inventive methods, such as instruction merging and induction variable (IV) replacement 200. In addition to instruction merging and induction variable replacement 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and instruction merging and induction variable replacement 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer, or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in instruction merging and induction variable replacement 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. Instruction merging and induction variable replacement instructions included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

The illustrative embodiments recognize and take into account that composite memory operations are memory operations that include address manipulation along with the data access. Composite memory operations can realize multiple standard addressing modes in traditional computer architectures (such as x86).

Consider the following representation of a composite memory operation that loads some data from some location and sends it to another hardware unit:

%  result=composite_load % base_addr % offset % increment % dst

In this representation, data would be loaded from a mutable base address % base_addr, plus an immutable offset % offset. The data at this calculated address would be sent to the destination % dst (usually in the form of a hardware unit that will consume it). The result of % base_addr+% increment would be stored in % result.

Consider the following representation of a composite memory operation that receives data from a hardware unit and stores it:

%  result=composite_store % base_addr % offset % increment % src

In this representation, data would be received from % src (usually in the form of a hardware unit sending data). The data would be stored to the address calculated by % base_addr+% offset (mutable base address plus immutable offset). The result of % base_addr+% increment would be stored in % result.

The illustrative embodiments also recognize and take into account that some architectures may have restrictions on what they can set as % increment. For example, some architectures may require the % increment to be only 0 or equal to the % offset. Other architectures may require the % increment to be only 0 or a function of some other property of the operation. The embodiments assume the % increment can only be 0 or equal to the % offset. Some of the examples below (specifically for Instruction Merging) show % increment values that do not fit this convention, but that is to express the flexibility of Instruction Merging.

The illustrative embodiments also recognize and take into account that these kinds of composite memory operations represent popular load/store operations in highly energy efficient decoupled access-execute based Artificial Intelligence (AI) accelerators.

Often these patterns of interleaved scalar memory manipulation operations and composite memory operations occur in loops, usually nested. Reducing the number of scalar memory manipulation operations is useful in general but even more so in nested loop structures. By using a combination of Instruction Merging and Induction Variable Replacement, these scalar memory manipulation operations can be reduced, and in many cases even completely eliminated.

The illustrative embodiments provide a method to eliminate additional scalar operations typically used to adjust memory addresses, often found in loop bodies. The illustrative embodiments use instruction merging and induction variable replacement to eliminate address manipulation operations to improve execution performance and potentially reduce instruction count.

Addressing modes describe how an address should be interpreted or modified before being used by an associated instruction. Base Register Addressing is one such addressing mode. In Base Register Addressing the effective address is obtained by adding the displacement (the relative offset) to the base address. Base Register Addressing can be realized with % base_addr as the base register, % offset as the constant address offset, and % increment set to 0.

In the present disclosure, it is assumed scalar subs have been canonicalized to the form % sub=<input>−<constant>.

Instruction merging is a helper optimization to facilitate opportunities for Induction Variable Replacement (IVR). Executing instruction merging on eligible blocks of code can potentially provide opportunities for IVR where there were none previously.

Instruction merging allows for the elimination of scalar memory address manipulation operations that are intermingled with composite memory operations. Look at the following code for example:

$$\% \ \text{add1} = \% \ inp1 + 100$$
$$\% \ \text{load1} = \text{composite\_load} \ \% \ \text{add1}, 10, 0, \% \ dst$$
$$\% \ \text{add2} = \% \ \text{load1} + 200$$
$$\% \ \text{load2} = \text{composite\_load} \ \% \ \text{add2}, 20, 0, \% \ dst$$
$$\% \ \text{add3} = \% \ \text{load2} + 300$$
$$\% \ \text{load3} = \text{composite\_load} \ \% \ \text{add3}, 30, 0, \% \ dst$$
$$\% \ \text{add4} = \% \ \text{load3} + 400$$

In the above example, there is a mixture of memory address manipulations in the form of scalar add operations and composite memory operations in the form of loads. Since composite memory operations can handle address manipulation in addition to loading or storing data, at first glance, one should be able to completely eliminate these scalar address manipulation operations. If the architecture supports % offset and % increments of any value that do not have to be 0 or equivalent, the add operations above can be completely eliminated:

$$\% \ \text{load1} = \text{composite\_load} \ \% \ inp1, 110, 1000, \% \ dst$$
$$\% \ \text{load2} = \text{composite\_load} \ \% \ \text{load1}, -680, 0, \% \ dst$$
$$\% \ \text{load3} = \text{composite\_load} \ \% \ \text{load2}, -370, 0, \% \ dst$$

However, some architectures may not support % offset and % increments of differing values except for non-zero offset and zero increment. In that case, all but one add can be eliminated, resulting in the following:

$$\% \ add1 = \% \ inp1 + 1000$$

$$\% \ load1 = composite\_load \ \% \ add1, -890, 0, \% \ dst$$

$$\% \ load2 = composite\_load \ \% \ load1, -680, 0, \% \ dst$$

$$\% \ load3 = composite\_load \ \% \ load2, -370, 0, \% \ dst$$

A series of instructions are eligible for instruction merging given the series contains composite memory operations with an offset containing constant/immediate values, scalar add/sub operations that must have one constant/immediate operand, and all the instructions in the series form a linearly chained series of instructions, meaning that each instruction feeds into the following instruction (see the examples above for illustrations of linearly chained instructions).

Several Deep Learning based AI workloads (e.g., CONV2D) satisfy the above requirements because of known tensor shapes and memory access patterns at compile-time.

Ideal candidates contain address manipulations and composite memory operations interleaved in a linear chain of instructions where the only instructions using those in the linear chain are in the linear chain themselves, with exception of the last instruction in the chain. For example, consider the following pseudocode describing an ideal contrived example:

```
%input = 0;
loop 1 to 10 {
    %add1 = %input + 100
    %load1 = composite_load %add1, 10, 0, %dst
    %add2 = %load1 + 200
    %load2 = composite_load %add2, 20, 0, %dst
    %add3 = %load2 + 300
    %load3 = composite_load %add3, 30, 0, %dst
    %add4 = %load3 + 400
    %input = %add4
    %func_result = func( )
    %mul = %func_result * 100
    func2(%mul)
}
```

The above example is an ideal candidate because the instructions eligible for Instruction Merging (% add1 through % add4) are linearly chained and only comprise scalar memory address manipulations and composite memory operations. There are no uses of those instructions outside the linear chain except one use of the last instruction in the chain. Therefore, modifying the operations will have minimum impact on instructions outside the eligible series of instructions.

In contrast, consider the following example:

```
%input = 0;
loop 1 to 10 {
    %add1 = %input + 100
    %load1 = composite_load %add1, 10, 0, %dst
    %add2 = %load1 + 200
    %load2 = composite_load %add2, 20, 0, %dst
    %add3 = %load2 + 300
    %load3 = composite_load %add3, 30, 0, %dst
    %add4 = %load3 + 400
```

-continued

```
    %input = %add4
    %mul = %add2 * 100 + %load2
    func2(%mul)
}
```

In this example, if % add2 is eliminated and % load2 is modified to accommodate Instruction Merging, % mul needs to be adjusted accordingly. In these cases, Instruction Merging can still be applied but the value of doing so may be negated.

Instructions do not need to be consecutive as long as the instructions linearly chain and meet the eligibility criteria for each instruction in the chain. For example:

```
%input = 0;
loop 1 to 10 {
    %add1 = %input + 100
    %load1 = composite_load %add1, 10, 0, %dst
    %func_result = func( )
    %add2 = %load1 + 200
    %load2 = composite_load %add2, 20, 0, %dst
    %add3 = %load2 + 300
    %mul = %func_result * 100
    %load3 = composite_load %add3, 30, 0, %dst
    func2(%mul)
    %add4 = %load3 + 400
    %input = %add4
}
```

The instructions % add1, % load1, % add2, % load2, % add3, % load3, and % add4 are still eligible and still ideal candidates because they are linearly chained—they feed and consume one another with no other uses outside updating the input to the linear chain for the next loop iteration. The optimizations used in the illustrative embodiments rely on analyzing use-chains not consecutive operations.

Figure 2B:
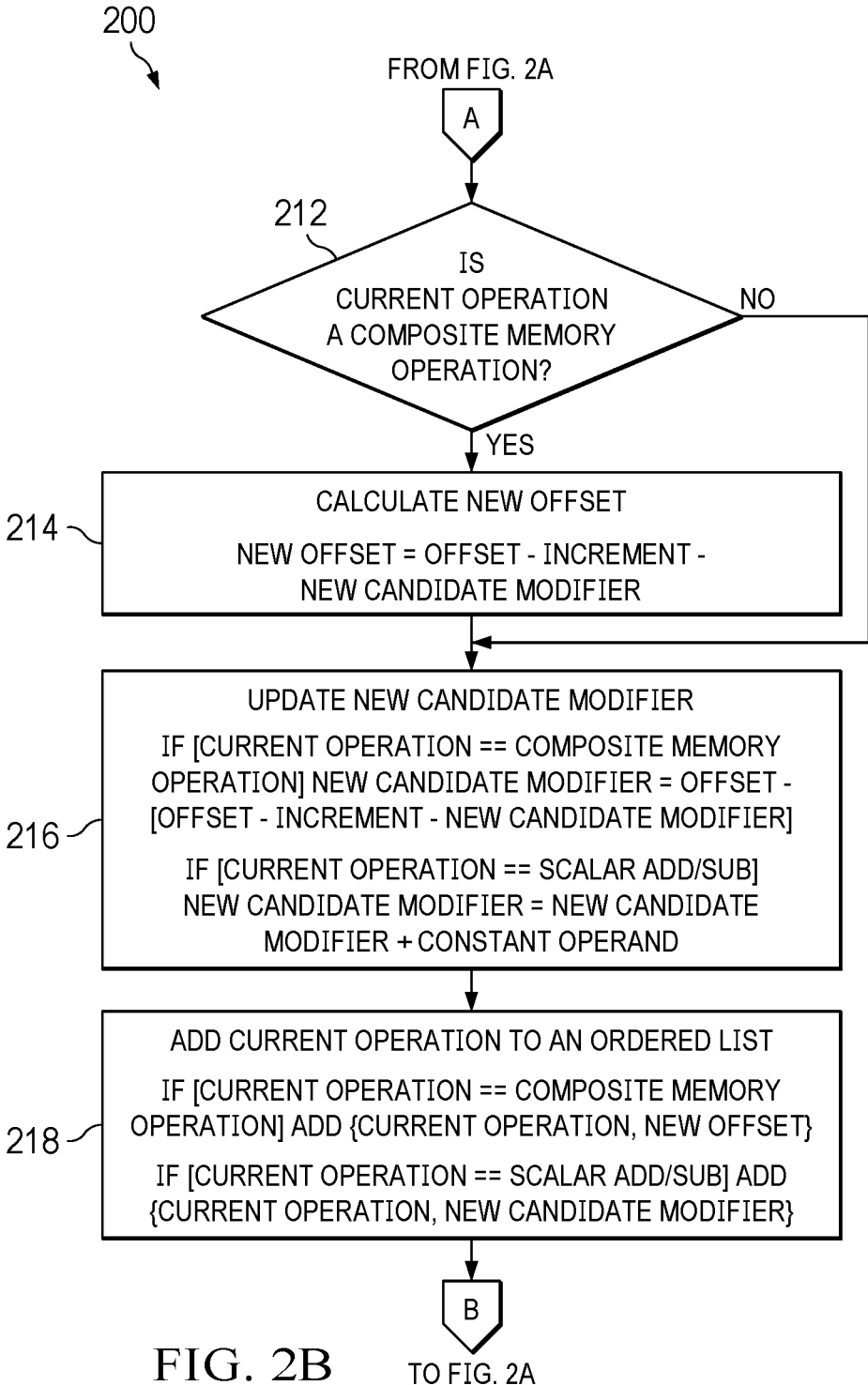
FIG. 2B depicts a flowchart of a process of analyzing candidates for instruction merging in accordance with an illustrative embodiment.

FIGS. 2A and 2B depict a flowchart of a process of analyzing candidates for instruction merging in accordance with an illustrative embodiment. Process 200 can be in carried out computing environment 100 in FIG. 1.

When identifying candidates and executing Instruction Merging, the loops are analyzed innermost first. While analyzing instructions for eligibility, or inserting scalar operations in this example, scalar subs are further canonicalized to their equivalent scalar add. For example, % sub=% inp−100 is equivalent to % add=% inp+−100.

Process 200 begins the analysis by identifying merging candidates among the operations in a loop (step 202). Step 202 comprises traversing the operations from the bottom-up (i.e., start with the last operation in the series of instructions), looking for a scalar add/sub (addition or subtraction) with one operand resolving to a compile time known constant. Such a scalar add/sub is a Merging Candidate.

Process 200 then tracks the constant operand value of the Merging Candidate (step 204). This step comprises initializing to the current value of the constant operand, referred to as the New Candidate Modifier.

Process 200 traverses each operation through the operation's relevant operand, referred to as the Input Operation (step 206). The Current Operation is initialized to the Merging Candidate for the first iteration of process 200. The input operation of an operand depends on its type. If it is a scalar add/sub, the Input Operation is the non-constant operand. If it is a composite memory operation, the Input Operation is the mutable base address operand.

Process 200 determines whether an Input Operation is only used by the Current Operation being analyzed and whether the input operation is an eligible mergeable operation (step 208). If at least one of these conditions is not met, the analysis ends.

Responsive to a determination that both conditions in step 208 are met, process 200 updates the Current Operation (Current Operation=Input Operation) (step 210).

Process 200 then determines whether the Current Operation is a composite memory operation (step 212). If the Current Operation is not a composite memory operation, process 200 updates the New Candidate Modifier (step 216).

If the Current Operation is a composite memory operation, process 200 first calculates a New Offset (New Offset=offset−increment−New Candidate Modifier) (step 214) before updating the New Candidate Modifier.

In step 216, if the Current Operation is a composite memory operation the New Candidate Modifier is updated by subtracting the New Offset from the offset. If the Current Operation is a scalar add/sub, the New Candidate Modifier is updated by adding the constant operand to the New Candidate Modifier.

After updating the New Candidate Modifier, process 200 adds a pairing of the Current Operation along with its New Offset/New Candidate Modifier data to an ordered list (step 218) and returns to step 206. If the Current Operation is a composite memory operation step 218 adds the Current Operation and New Offset to the list. If the Current Operation is a scalar add/sub, step 218 add the Current Operation and New Candidate Modifier to the list.

The example shown in FIG. 2 is not exhaustive in individual steps required and is intended to provide a process to exemplify how one may utilize this aspect of the illustrative embodiments.

Figure 3:
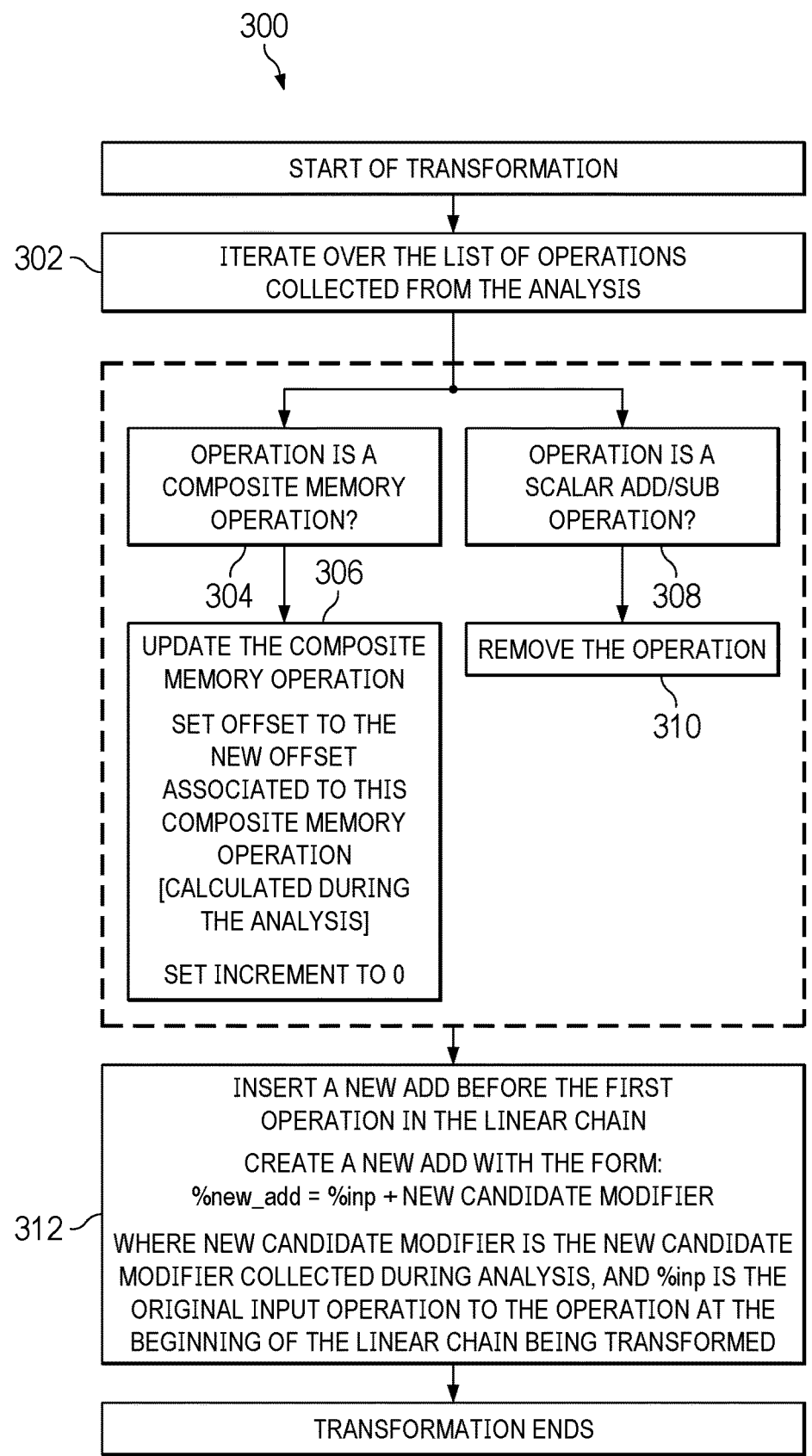
FIG. 3 depicts a flowchart of a process for transformation of operations by means of instruction merging in accordance with an illustrative embodiment.

FIG. 3 depicts a flowchart of a process for transformation of operations by means of instruction merging in accordance with an illustrative embodiment. Process 300 can be carried out in computing environment 100 in FIG. 1. Process 300 leverages the analysis performed in process 200 in FIG. 2.

Process 300 iterates over the list of operations collected from the analysis performed by process 200 (step 302). Responsive to a determination that the operation in question is a composite memory operation (step 304), process 300 updates the composite memory operation by setting its offset to the New Offset associated to this composite memory operation (calculated in step 214) (step 306). The increment of the composite memory operation is set to 0.

Responsive to a determination that the operation in question is a scalar add/sub operation (step 308), process 300 removes the operation (step 310).

Process 300 then inserts a new add before the first operation in the linear chain (step 312). Step 312 creates a new add with the form:

$$\% \; new\_add = \% \; inp + \text{New Candidate Modifier}$$

where New Candidate Modifier is the New Candidate Modifier collected during the analysis in process 200, and % inp is the original Input Operation to the operation at the beginning of the linear chain being transformed.

Process 300 then ends.

For ease of illustration FIG. 3 does not show the step where the operations are updated to reflect the new control flow. When a scalar add/sub is removed, instructions using the add/sub will replace their uses of the add/sub with the add/sub's input operation. When the scalar add representing the transformed Merging Candidate is inserted at the beginning of the instruction series, the proceeding operation's input is modified to be the new add.

Instruction Merging can be executed in a top-down or bottom-up approach. In the top-down approach, instructions in the eligible linearly chained series are merged through the composite memory operations from top of the series to the bottom (essentially, in the same order they are encountered in the program). In the bottom-up approach, instructions in the eligible linearly chained series are merged from the bottom of the series to the top (in the opposite order they are encountered in the program).

The bottom-up approach is the preferred approach for Instruction Merging to prepare for IVR since it will shift the add/sub at the bottom of the linear chain to the top. It is also the preferred method in architectures that do not allow offsets and increments to differ other than to have an offset of non-zero value and an increment value of 0 because it will always set the increment to 0 after merging. In the bottom-up approach, all but one scalar memory manipulation operation is eliminated, and the remaining operation is at the top of the instruction series. The top-down approach is leveraged in IVR itself.

Figure 4:
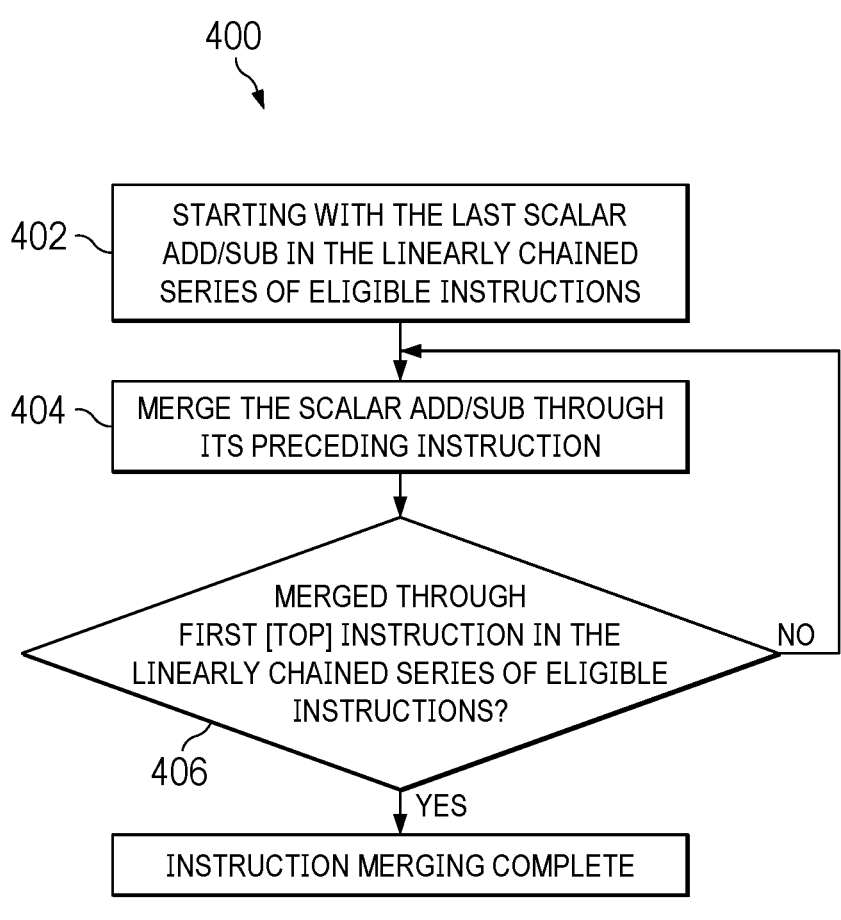
FIG. 4 depicts a flowchart of a process for bottom-up instruction merging in accordance with an illustrative embodiment.

FIG. 4 depicts a flowchart of a process for bottom-up instruction merging in accordance with an illustrative embodiment. Process 400 can be carried out in computing environment 100 in FIG. 1.

Process 400 begins with the last scalar add/sub in the linearly chained series of eligible instructions (step 402) and merges the scalar add/sub through its preceding instruction (step 404). To merge a scalar add/sub through a composite memory operation, the following transformation can be applied:

Recall the theoretical format for a composite load operation:

% result=composite_load % base_addr, % offset, % increment, % destination

Given:

$$\% \; load\_res = composite\_load \; \% \; base\_addr,$$
$$\% \; offset, \% \; increment, \% \; destination$$
$$\% \; add\_res = \% \; load\_res + \% \; add\_const$$

Transformed (see FIG. 3):

$$\% \; add\_res' =$$
$$\% \; base\_addr + (\% \; offset - (\% \; offset - \% \; increment - \% \; add\_const))$$
$$\% \; load\_res' = composite\_load \; \% \; add\_res',$$
$$(\% \; offset - \% \; increment - \% \; add\_const), 0, \% \; destination$$

The add will shift above the load, and the described changes will occur to both operations. Note that since the add now proceeds the load, the input to the add and the load are modified to match the new control flow of the program. Every time a scalar add/sub is merged through a composite memory operation, the operation preceding and proceeding the scalar add/sub will have its operands modified according to the new control flow of the program.

Process 400 determines whether it has merged through the first (top) instruction in the linearly chained series of eligible instructions (step 406). If it has not yet reached the top of the series, process 400 returns to step 404. As other scalar adds/subs are encountered, these can be trivially combined with the scalar add/sub merging through the instruction chain, eliminating the encountered add/sub.

Process 400 continues merging through the instructions until it reaches the top of the series then ends.

The following example illustrates a step-by-step bottom-up instruction merge for 0 increments.

Given the following example of an eligible linearly chained series of instructions:

$$\% \; add1 = \% \; inp1 + 100$$

$$\% \; load1 = composite\_load \; \% \; add1, 10, 0, \% \; dst$$

$$\% \; add2 = \% \; load1 + 200$$

$$\% \; load2 = composite\_load \; \% \; add2, 20, 0, \% \; dst$$

$$\% \; add3 = \% \; load2 + 300$$

$$\% \; load3 = composite\_load \; \% \; add3, 30, 0, \% \; dst$$

$$\% \; add4 = \% \; load3 + 400$$

Merge % add4 through % load3:

$$\% \; add1 = \% \; inp1 + 100$$

$$\% \; load1 = composite\_load \; \% \; add1, 10, 0, \% \; dst$$

$$\% \; add2 = \% \; load1 + 200$$

$$\% \; load2 = composite\_load \; \% \; add2, 20, 0, \% \; dst$$

$$\% \; add3 = \% \; load2 + 300$$

$$\% \; add4 = \% \; add3 + 400$$

$$\% \; load3 = composite\_load \; \% \; add4, -370, 0, \% \; dst$$

Combine % add3 and % add4:

$$\% \; add1 = \% \; inp1 + 100$$

$$\% \; load1 = composite\_load \; \% \; add1, 10, 0, \% \; dst$$

$$\% \; add2 = \% \; load1 + 200$$

$$\% \; load2 = composite\_load \; \% \; add2, 20, 0, \% \; dst$$

$$\% \; add4 = \% \; load2 + 700$$

$$\% \; load3 = composite\_load \; \% \; add4, -370, 0, \% \; dst$$

Merge % add4 through % load2:

$$\% \; add1 = \% \; inp1 + 100$$

$$\% \; load1 = composite\_load \; \% \; add1, 10, 0, \% \; dst$$

18

$$\% \; add2 = \% \; load1 + 200$$

$$\% \; add4 = \% \; load2 + 700$$

$$\% \; load2 = composite\_load \; \% \; add4, -680, 0, \% \; dst$$

$$\% \; load3 = composite\_load \; \% \; load2, -370, 0, \% \; dst$$

Combine % add2 and % add4:

$$\% \; add1 = \% \; inp1 + 100$$

$$\% \; load1 = composite\_load \; \% \; add1, 10, 0, \% \; dst$$

$$\% \; add4 = \% \; load1 + 900$$

$$\% \; load2 = composite\_load \; \% \; add4, -680, 0, \% \; dst$$

$$\% \; load3 = composite\_load \; \% \; load2, -370, 0, \% \; dst$$

Merge % add4 through % load1:

$$\% \; add1 = \% \; inp1 + 100$$

$$\% \; add4 = \% \; load1 + 900$$

$$\% \; load1 = composite\_load \; \% \; add4, -890, 0, \% \; dst$$

$$\% \; load2 = composite\_load \; \% \; load1, -680, 0, \% \; dst$$

$$\% \; load3 = composite\_load \; \% \; load2, -370, 0, \% \; dst$$

Combine % add4 and % add1:

$$\% \; add4 = \% \; inp1 + 1000$$

$$\% \; load1 = composite\_load \; \% \; add4, -890, 0, \% \; dst$$

$$\% \; load2 = composite\_load \; \% \; load1, -680, 0, \% \; dst$$

$$\% \; load3 = composite\_load \; \% \; load2, -370, 0, \% \; dst$$

Assuming % inp is 100, looking at the input code block, the following addresses are loaded and values returned:

$$\% \; add1 = \% \; inp1 + 100 \leftarrow returns \; 200$$

$$\% \; load1 = composite\_load \; \% \; add1,$$

$$10, 0, \% \; dst \leftarrow loads \; 210, returns \; 200$$

$$\% \; add2 = \% \; load1 + 200 \leftarrow returns \; 400$$

$$\% \; load2 = composite\_load \; \% \; add2,$$

$$20, 0, \% \; dst \leftarrow loads \; 420, returns \; 400$$

$$\% \; add3 = \% \; load2 + 300 \leftarrow returns \; 700$$

$$\% \; load3 = composite\_load \; \% \; add3,$$

$$30, 0, \% \; dst \leftarrow loads \; 730, returns \; 700$$

$$\% \; add4 = \% \; load3 + 400 \leftarrow returns \; 1100$$

Comparing to the transformed code block, the same addresses are loaded, and the code block ends with the same result value (1100):

$$\% \ add4 = \% \ inp1 + 1000 \leftarrow returns \ 1100$$

$$\% \ load1 = composite\_load \ \% \ add4,$$

$$-890, 0, \% \ dst \leftarrow loads \ 210, returns \ 1100$$

$$\% \ load2 = composite\_load \ \% \ load1,$$

$$-680, 0, \% \ dst \leftarrow loads \ 420, returns \ 1100$$

$$\% \ load3 = composite\_load \ \% \ load2,$$

$$-370, 0, \% \ dst \leftarrow loads \ 730, returns \ 1100$$

The following example illustrates a step-by-step bottom-up instruction merge with non-zero increments.

Given the following example of an eligible linearly chained series of instructions:

$$\% \ load = composite\_load \ \% \ inp, 30, 100, \% \ dst$$

$$\% \ add = \% \ load + 400$$

Merge % add through % load:

$$\% \ add = \% \ inp + (30 - (30 - 100 - 400))$$

$$\% \ load = composite\_load \ \% \ add, (30 - 100 - 400), 0, \% \ dst$$

$$\rightarrow$$

$$\% \ add = \% \ inp + 500$$

$$\% \ load = composite\_load \ \% \ add, -470, 0, \% \ dst$$

Comparing the original code block, the same addresses are loaded and the result value at the end of the code block is preserved.

Original code block (assuming % inp is 100):

$$\% \ load = composite\_load \ \% \ inp, 30, 100, \% \ dst \leftarrow loads \ 130, returns \ 200$$

$$\% \ add = \% \ load + 400 \leftarrow returns \ 600$$

Transformed code block (assuming % inp is 100):

$$\% \ add = \% \ inp + 500 \leftarrow returns \ 600$$

$$\% \ load = composite\_load \ \% \ add, -470, 0, \% \ dst \leftarrow loads \ 130, returns \ 600$$

Figure 5:
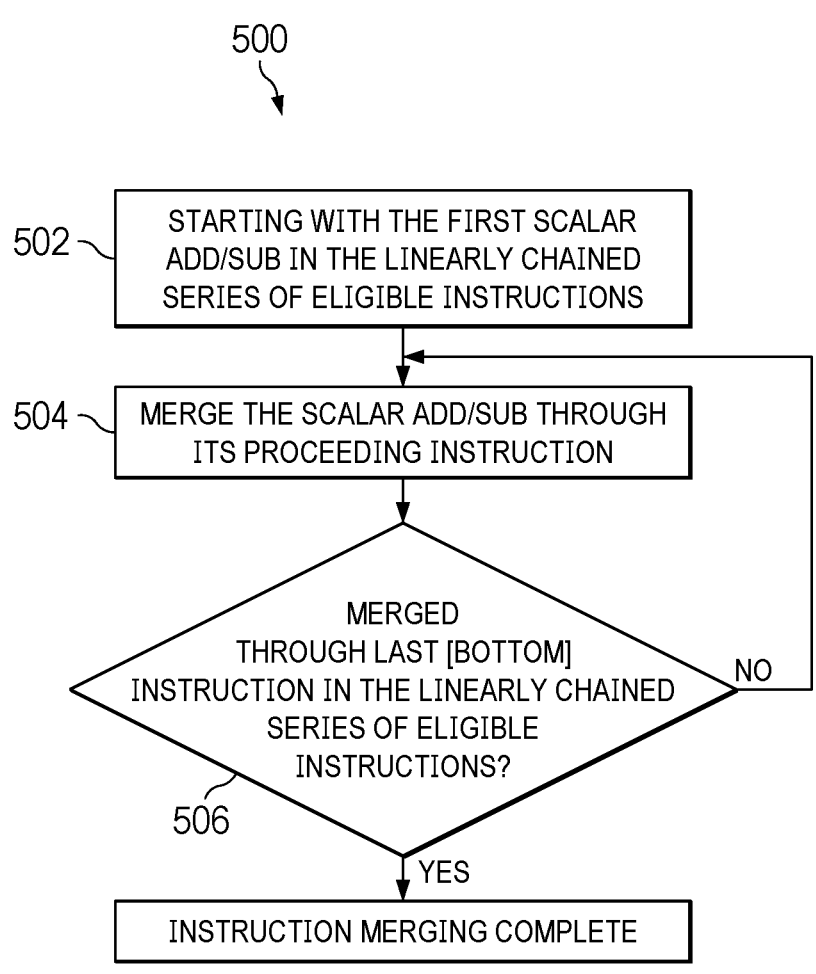
FIG. 5 depicts a flowchart of a process for top-down instruction merging in accordance with an illustrative embodiment.

FIG. 5 depicts a flowchart of a process for top-down instruction merging in accordance with an illustrative embodiment. Process 500 can be carried out in computing environment 100 in FIG. 1.

Process 500 begins with the first scalar add/sub in the linearly chained series of eligible instructions (step 502) and merges the scalar add/sub through its proceeding instruction (step 504).

Process 500 determines whether it has merged through the last (bottom) instruction in the linearly chained series of eligible instructions (step 406). If it has not yet reached the bottom of the series, process 500 returns to step 504.

Process 500 continues merging through the instructions until it reaches the bottom of the series then ends.

There are two approaches to the top-down approach: fully-merging and merging through. It should be noted that IVR leverages the merging through approach.

Fully merging a scalar add/sub through a composite memory operation combines the constant/immediate operand of the add/sub operation with the offset and increments. Since the add/sub will be eliminated, the input to the composite memory operation is modified to match the new control flow of the program. Every time a scalar add/sub is merged into a composite memory operation, the operation proceeding the scalar add/sub will have its operands modified according to the new control flow of the program.

Recall the theoretical format for a composite load operation:

$$\% \ result = composite\_load \ \% \ base\_addr,$$

$$\% \ offset, \% \ increment, \% \ destination$$

Given:

$$\% \ add\_res = \% \ inp + \% \ add\_const$$

$$\% \ load\_res = composite\_load \ \% \ base\_addr,$$

$$\% \ offset, \% \ increment, \% \ destination$$

Transformed (see FIG. 3):

$$\% \ load\_res' = composite\_load \ \% \ inp, (\% \ offset + \% \ add\_const),$$

$$(\% \ increment + \% \ add\_const), \% \ destination$$

In architectures where the increment can only be equal to the offset or 0, unless the composite memory operations eligible for merging have offsets and increments equal to 0, the top-down approach cannot be used due to breaking this requirement.

The following example illustrates fully merging top-down instruction merging.

Assuming % inp is 100, given:

$$\% \ add = \% \ inp + 400 \leftarrow returns \ 500$$

$$\% \ load = composite\_load \ \% \ add, 30, 100, \% \ dst \leftarrow loads \ 530, returns \ 600$$

Merge % add into % load:

$$\% \ load = composite\_load \ \% \ inp, 400 + 30, 400 + 100, \% \ dst$$

$$\rightarrow$$

$$\% \ load = composite\_load \ \% \ inp, 430,$$

$$500, \% \ dst \leftarrow loads \ 530, returns \ 600$$

Merging a scalar add/sub through a composite memory operation combines the constant/immediate operand of the add/sub operation with the offset of the composite memory operation. Since the add/sub will remain but be shifted to proceeding the composite memory operation, no change to the increment of the composite memory operation is required. The add/sub remains unchanged.

Recall the theoretical format for a composite load operation:

$\%$ result=composite_load $\%$ base_addr, $\%$ offset, $\%$ increment, $\%$ destination Given:

$$\% \text{ add\_res} = \% \, inp + \% \text{ add\_const}$$

$\%$ load_res = composite_load $\%$ add_res, $$\% \text{ offset}, \% \text{ increment}, \% \text{ destination}$$

Transformed (see FIG. 3):

$\%$ load_res' = composite_load $\%$ *inp*, $$(\% \text{ offset} + \% \text{ add\_const}), \% \text{ increment}, \% \text{ destination}$$

$$\% \text{ add\_res'} = \% \text{ load\_res'} + \% \text{ add\_const}$$

The following example illustrates top-down instruction merging through.

Assuming $\%$ inp is 100, given:

$$\% \text{ add} = \% \, inp + 400 \leftarrow \text{returns } 500$$

$\%$ load = composite_load $\%$ add, 30, 100, $\%$ *dst* ← loads 530, returns 600

Merge $\%$ add through $\%$ load:

$$\% \text{ load} = \text{composite\_load} \% \, inp, 400 + 30, 400 + 100, \% \, dst$$

$$\% \text{ add} = \% \text{ load} + 400$$

$$\rightarrow$$

$\%$ load = composite_load $\%$ *inp*, 430, $$100, \% \, dst \leftarrow \text{loads } 530, \text{ returns } 200$$

$$\% \text{ add} = \% \text{ load} + 400 \leftarrow \text{returns } 600$$

Induction Variable Reduction (IVR) reduces the number of scalar operations in inner loop bodies which results in improved execution performance. Some implementations of composite memory operations have restrictions on what valid values are for the increment operand. Therefore, it is not possible to simply merge scalar operations using Instruction Merging with the Top-Down Fully Merging approach. Doing so would possibly require modifying the increment to a value not supported by the hardware. For example, some hardware may require the increment to either be 0 or equal to some other operand or attribute (such as offset) that can have behavioral consequences if not set appropriately.

IVR leverages the nature of composite memory operations and the concept of induction variables to move a scalar address manipulation operation out of its containing loop body.

In computer science, an induction variable (IV) is a variable that is increased or decreased by a fixed amount every iteration of a loop or is a linear function of another IV. A basic IV is explicitly modified by the same constant amount during each iteration of a loop. For example, in the following loop, i is a basic IV:

```
for (i = 0; i < n; ++i) {
    ...
}
```

A basic IV is explicitly modified by the same constant amount during each iteration of a loop. A derived IV is a linear function of another IV. In the following loop, j is a derived IV that is a linear function of a basic IV, i:

```
for (i = 0; i < n; ++i) {
    j = 2*i + 10;
}
```

Consider the following pseudo code for an example:

```
%0 = constant 0
%result = for (iterations = 100) (%mainIV = %0) {
    %add1 = %mainIV+ 1000
    %load1 = composite_load %add1, −890, 0, %dst
    %load2 = composite_load %load1, −680, 0, %dst
    %load3 = composite_load %load2, −370, 0, %dst
    yield %load3
}
```

The above code example initializes a variable $\%$ mainIV to the value held by variable $\%$ 0. Then a loop consisting of 100 iterations is executed. The loop contains an add followed by three composite memory operations. At the end of the loop body a yield operation sets $\%$ mainIV to the value held by variable $\%$ load3.

It should be noted that in this code example, $\%$ mainIV is a basic IV since it is modified by the same value every iteration, and $\%$ add1 is a derived IV which is derived from $\%$ mainIV. IVR moves derived IVs out of loop bodies.

Applying IVR to the above pseudo code example would result in the following:

```
%add1 = %0 − 890
%result = for (iterations = 100) (%mainIV = %add1) {
    %load1 = composite_load %mainIV, 1000, 1000, %dst
    %load2 = composite_load %load1, 210, 0, %dst
    %load3 = composite_load %load2, 520, 0, %dst
    yield %load3
}
%new_result = %result + 890
```

After applying IVR, $\%$ add1 is no longer in the loop body. An additional add is needed ($\%$ new_result) to correct the return result value of the loop. This add can be eliminated if the loop result is not used, or it can be merged into subsequent operations if such operations exist.

IVR can be better enabled by executing Instruction Merging beforehand since Instruction Merging can reduce and shift scalar add/sub operations to a position and format conducive to IVR.

It is recommended that IVR be executed with innermost loops first. Executing IVR this way can result in moving scalar add/sub from inner loops to outer loops where they may potentially then become candidates for IVR again, eventually getting completely removed from the loop nest. This approach is a common pattern seen in many Deep Learning AI workloads.

To be a candidate for IVR, the scalar address manipulation operation must be a derived induction variable. Ideal candidates comprise loop bodies with linearly chained series of composite memory operations with constant/immediate offsets and increments and/or scalar address manipulation operations with a constant/immediate operand.

Figure 6:
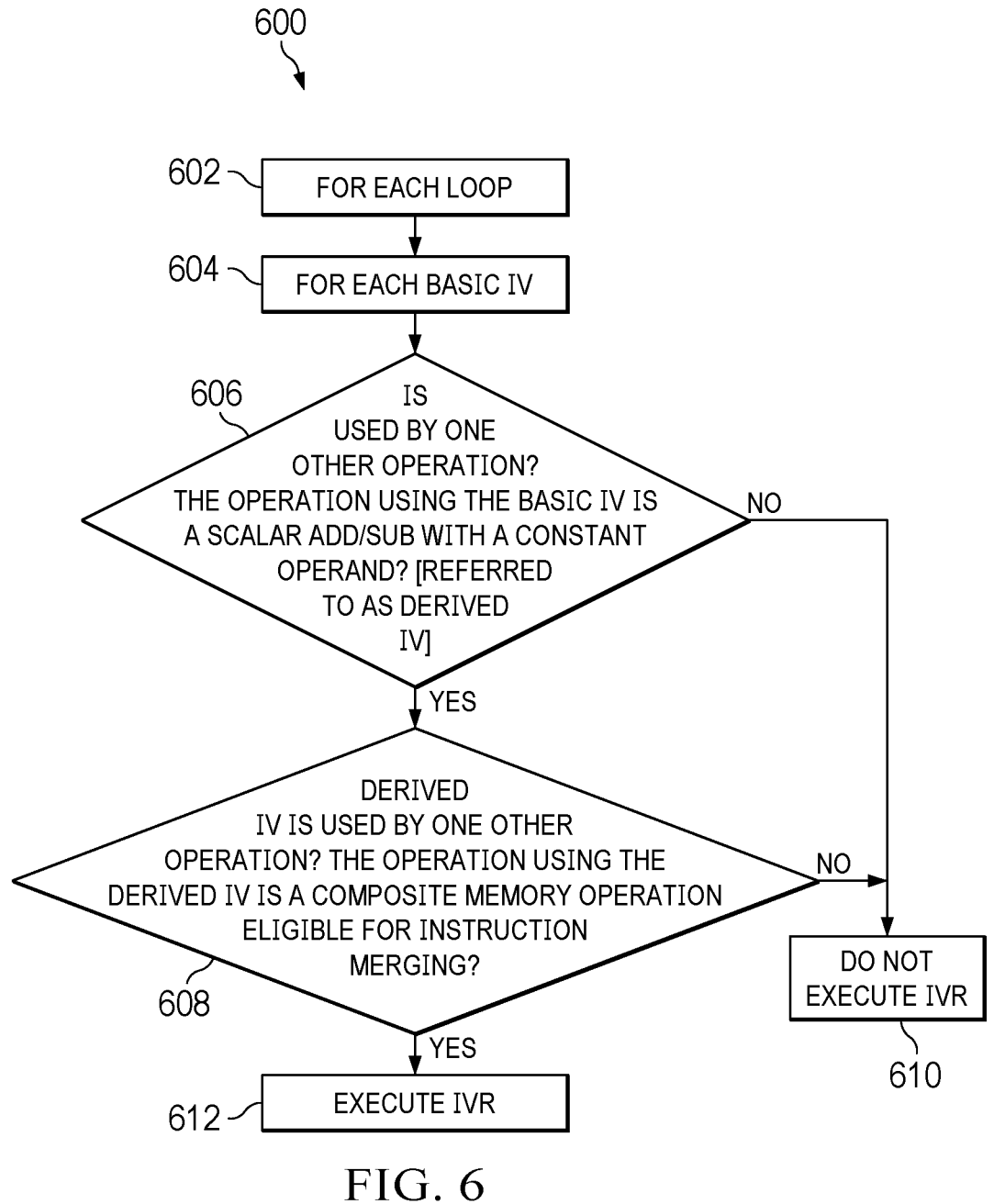
FIG. 6 depicts a flowchart of a process for identifying candidates for induction variable replacement in accordance with an illustrative embodiment.

FIG. 6 depicts a flowchart of a process for identifying candidates for IVR in accordance with an illustrative embodiment. Process 600 can be carried out in computing environment 100 in FIG. 1.

Process 600 begins by selecting a program loop (step 602) and then within that loop selecting a basic IV (step 604).

For the basic IV in question, process 600 determines whether the basic IV is used by another operation and whether the operation using the basic IV is a scalar add/sub with a constant operand (Derived IV) (step 606). If the basic IV is not used by a Derived IV, process 600 ends and an IVR is not performed for that basic IV (step 610).

If the basic IV is used by a Derived IV, process 600 determines whether the Derived IV is used by another operation and whether the operation using the Derived IV is a composite memory operation eligible for instruction merging (step 608). If the Derived IV is not used by a composite memory operation eligible for instruction merging, process 600 ends and an IVR is not performed for that basic IV (step 610).

If the Derived IV is used by a composite memory operation eligible for instruction merging, an IVR is performed (step 612) (see FIG. 7).

Process 600 is repeated for each program loop and each basic IV in each program loop.

Several Deep Learning based AI workloads (e.g., CONV2D) satisfy the above requirements because of known tensor shapes and memory access patterns at compile-time. In these workloads, there are many examples of nested loops in the above described ideal form. By using Instruction Merging and then IVR on these candidates, scalar adds/subs can be completely eliminated in innermost loop bodies and minimized in the rest of the loop nest. As with instruction merging, it is assumed scalar subs are canonicalized to an equivalent add operation for simplicity.

Viewing the composite memory operations in a generalized, unified way exposes manipulations that can be leveraged to enable Instruction Merging and Induction Variable Replacement.

Offset and increment information can be separated out from the composite memory operation. This separation is referred to as unified form in the present disclosure because it generalizes composite memory operations whether they have an increment of 0 or an increment of non-zero value. Given:

%  result=comp_mem_op % base_addr, % offset, % increment, % dst
In unified form:

$$\% \; pre = \% \; base\_addr + \% \; offset$$

$$\% \; result = comp\_mem\_op \; \% \; pre, 0, 0, \% \; dst$$

$$\% \; post = \% \; result - \% \; offset + \% \; increment$$

The composite memory operation will still operate on the same address, and the result of the chain of operations will remain the same.

For example (assuming % inp is 100):
%  result=composite_load % inp, 30, 100, % dst←loads 130, returns 200
In unified form:

$$\% \; pre = \% \; inp + 30 \leftarrow returns \; 130$$

$$\% \; result = composite\_load \; \% \; pre, 0, 0, \% \; dst \leftarrow loads \; 130, returns \; 130$$

$$\% \; post = \% \; result - 30 + 100 \leftarrow returns \; 200$$

Example (assuming % inp is 100):
%  result=composite_load % inp, 30, 0, % dst←loads 130, returns 100
In unified form:

$$\% \; pre = \% \; inp + 30 \leftarrow returns \; 130$$

$$\% \; result = composite\_load \; \% \; pre, 0, 0, \% \; dst \leftarrow loads \; 130, returns \; 130$$

$$\% \; post = \% \; result - 30 + 0 \leftarrow returns \; 100$$

FIG. 7 depicts a flowchart of a process for induction variable replacement (IVR) in accordance with an illustrative embodiment. Process 700 can be carried out in computing environment 100 in FIG. 1.

The example shown in FIG. 7 assumes the following example code block:

```
%0 = constant 0
%result = for (iterations = 100) (%mainIV = %0) {
    %add1 = %mainIV + 1000
    %load1 = composite_load %add1, −890, 0, %dst
    %load2 = composite_load %load1, −680, 0, %dst
    %load3 = composite_load %load2, −370, 0, %dst
    yield %load3
}
```

Process 700 begins by selecting an IVR candidate in a program loop (step 702). The IVR candidate is derived from a basic induction variable in the program loop. In the present example, the candidate for IVR is % add1, which is a derived IV of the basic IV % mainIV. The candidate will replace % mainIV.

In step 704 process 700 converts the composite memory operation proceeding the IVR candidate (% load1) to unified form:

```
%0 = constant 0
%result = for (iterations = 100) (%mainIV = %0) {
    %add1 = %mainIV + 1000
    %pre = %add1 + −890
    %load1 = composite_load %pre, 0, 0, %dst
    %post = %load1 − −890 + 0
    %load2 = composite_load %post, −680, 0, %dst
    %load3 = composite_load %load2, −370, 0, %dst
    yield %load3
}
```

Step 706 swaps the constant values of the IVR candidate (% add1) and the proceeding add operation (% pre) in the program loop:

```
%0 = constant 0
%result = for (iterations = 100) (%mainIV = %0) {
    %add1 = %mainIV + −890
    %pre = %add1 + 1000
    %load1 = composite_load %pre, 0, 0, %dst
    %post = %load1 − −890 + 0
    %load2 = composite_load %post, −680, 0, %dst
    %load3 = composite_load %load2, −370, 0, %dst
    yield %load3
}
```

Step 708 converts the composite memory operation in unified form (% load1) to a composite memory operation with an increment by combining the preceding add operation (% pre) with it:

```
%0 = constant 0
%result = for (iterations = 100) (%mainIV = %0) {
    %add1 = %mainIV + −890
    %load1 = composite_load %add1, 1000, 1000+0, %dst
    %post = %load1 + 890
    %load2 = composite_load %post, −680, 0, %dst
    %load3 = composite_load %load2, −370, 0, %dst
    yield %load3
}
```

Step 710 uses Instruction Merging with a Top-Down Merging Through approach to move the add proceeding the composite memory operation (% post) modified in step 708 (% load1) to the end of the linearly chained series of eligible operations:

```
%0 = constant 0
%result = for (iterations = 100) (%mainIV = %0) {
    %add1 = %mainIV + −890
    %load1 = composite_load %add1, 1000, 1000, %dst
    %load2 = composite_load %load1, 210, 0, %dst
    %load3 = composite_load %load2, 520, 0, %dst
    %post = %load3 + 890
    yield %post
}
```

Note: If there are no eligible operations for Instruction Merging to move the add, the add will stay where it is. If this is the case, % post would not be able to be eliminated in the rest of the steps.

Step 712 substitutes the basic IV (% mainIV) with the IVR candidate (% add1). This step involves a number of parts:

Manipulate the IVR candidate (% add1) to get the equivalent expression (equation) to the basic IV (% mainIV):

$$\% \; add1 = \% \; mainIV + -890 \rightarrow \% \; mainIV = \% \; add1 - -890$$

Then replace the basic IV (% mainIV) with the IVR candidate (% add1) according to the manipulation:

$$\% \; mainIV = \%0 \rightarrow \% \; add1 - -890 = \%0$$

Shift constants to the right side of the equation:

$$\% \; add1 = \%0 - 890$$

Now the starting value of the newly replaced basic IV is modified. To compensate for this modification to ensure the correct values are still encountered in the loop body, the yield value of the program loop is adjusted the same way (% adjustment) (step 714):

```
%0 = constant 0
%result = for (iterations = 100) (%add1 = %0 − 890) {
    %load1 = composite_load %add1, 1000, 1000, %dst
    %load2 = composite_load %load1, 210, 0, %dst
    %load3 = composite_load %load2, 520, 0, %dst
    %post = %load3 + 890
    %adjustment = %post − 890
    yield %adjustment
}
```

Note: % post and % adjustment will cancel out, eliminating both operations.

Step 716 moves the calculation for the replaced basic IV out of the program loop.

The result value of the loop (% result) will be the value of % add1 in the last iteration. Since the loop now starts at a different value adjusted for the updated loop body, the result value of the loop is adjusted to maintain the same behavior prior to transformation (step 718).

The adjustment can take the form of an add operation in the following form:

```
result_adjustment = loop result + (constant value modifying the original
basic IV input * −1)
    →
%result_adjustment = %result + (−890 * −1)
%0 = constant 0
%add1_base = %0 − 890
%result = for (iterations = 100) (%add1 = %add1_base) {
    %load1 = composite_load %add1, 1000, 1000, %dst
    %load2 = composite_load %load1, 210, 0, %dst
    %load3 = composite_load %load2, 520, 0, %dst
    yield %load3
}
%result_adjustment = %result + 890
```

To verify the result, recall the original code block:

```
%0 = constant 0
%result = for (iterations = 2) (%mainIV = %0) {
    %add1 = %mainIV + 1000
    %load1 = composite__load %add1, –890, 0, %dst
    %load2 = composite__load %load1, –680, 0, %dst
    %load3 = composite__load %load2, –370, 0, %dst
    yield %load3
}
```

Looking at the first two iterations of the original code block:

| | Iteration 1 | | Iteration 2 | |
| --- | --- | --- | --- | --- |
| | Loads | Returns | Loads | Returns |
| %mainIV | | 0 | | 1000 |
| %add1 | | 1000 | | 2000 |
| %load1 | 110 | 1000 | 1110 | 2000 |
| %load2 | 320 | 1000 | 1320 | 2000 |
| %load3 | 630 | 1000 | 1630 | 2000 |

If the loop only executed for two iterations, the result of the code block (% result) is 2000.

Recall the transformed code block:

```
%0 = constant 0
%add1__base = %0 – 890
%result = for (iterations = 2) (%add1 = %add1__base) {
    %load1 = composite__load %add1, 1000, 1000, %dst
    %load2 = composite__load %load1, 210, 0, %dst
    %load3 = composite__load %load2, 520, 0, %dst
    yield %load3
}
%result__adjustment = %result + 890
```

Looking at the first two iterations of the transformed code block:

| | Iteration 1 | | Iteration 2 | |
| --- | --- | --- | --- | --- |
| | Loads | Returns | Loads | Returns |
| %add1 | | –890 | | 110 |
| %load1 | 110 | 110 | 1110 | 1110 |
| %load2 | 320 | 110 | 1320 | 1110 |
| %load3 | 630 | 110 | 1630 | 1110 |

If the loop only executed for two iterations, the result of the code block (% result_adjustment) is 1110+890 which is 2000.

Comparing these results, both the original code block and the transformed code block produce the same result and load the same addresses.

This same concept can be applied to code sequences other than those containing only scalar operations and composite memory operations as long as they can be manipulated to retain the same behavior.

It should be noted that, for ease of illustration, FIG. 7 omits showing updates to the operation inputs. The updates are exemplified but not described. When instructions are moved around, doing so changes the control flow of the program. Therefore, as each step is executed, inputs to operations are modified accordingly to maintain correct, updated control flow.

The above is a high-level example implementation of Induction Variable Replacement in a structured control flow environment. This example adds some constraints that may not be necessary for a different implementation for the purpose of simplifying the example. The example is also not exhaustive in individual steps required.

In the example shown in FIG. 7 it is anticipated that the operation following the IVR Candidate is a composite memory operation because this is a common and useful case. However, the IVR Candidate could be followed by (used by) a different kind of operation that is able to be modified accordingly to maintain same behavior.

As used herein, a "number of," when used with reference to objects, means one or more objects. For example, a "number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, a "computer instruction," or "computer program", means one step or a set of steps that includes information on how to operate, perform, or maintain particular computer software or hardware. For example, a "computer instruction" can be a computer program instruction in the form of lines of code or source code that are executable by a computer system.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present disclosure have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer-implemented method of induction variable replacement (IVR), the method comprising:

using a number of processors to perform:

identifying an IVR candidate in a program loop comprising a linearly chained series of eligible operations, wherein the IVR candidate is a derived induction variable derived from a basic induction variable in the program loop;

converting a composite memory operation that directly uses the IVR candidate to a unified form, wherein offset information and increment information are separated from the composite memory operation;

identifying a scalar add operation that precedes the composite memory operation in the linearly chained series of eligible operations, the scalar add operation having a constant operand;

swapping constant values associated with the IVR candidate and the scalar add operation;

converting the composite memory operation in the unified form to a composite memory operation having an increment that accommodates the scalar add operation; moving the scalar add operation to a bottommost position within the linearly chained series of eligible operations using instruction merging;

substituting the basic induction variable with the IVR candidate in the program loop;

updating a yield value of the program loop based on a control flow resulting from the substitution of the IVR candidate for the basic induction variable;

moving a calculation of the basic induction variable outside the program loop; and adjusting a result value produced by the program loop such that program behavior prior to IVR is preserved.

2. The method of claim 1, wherein identifying the IVR candidate in the program loop further comprises:

identifying the basic induction variable in the program loop;

determining that the basic induction variable is used by a derived induction variable via the scalar add or subtract operation having a constant operand; and determining that the derived induction variable is used by the composite memory operation eligible for instruction merging.

3. The method of claim 1, wherein moving the scalar add operation to the bottommost position within the linearly chained series of eligible operations comprises:

merging a first scalar add or subtract operation in the linearly chained series through at least one subsequent instruction; and repeating the merging until the first scalar add or subtract operation is merged through a last instruction in the linearly chained series of eligible operations.

4. The method of claim 1, wherein the substituting of the basic induction variable with the IVR candidate further comprises:

manipulating the IVR candidate to produce an equation equivalent to the basic induction variable;

replacing the basic induction variable using the equation; and shifting constant terms to a right side of the equation.

5. The method of claim 1, further comprising executing bottom-up instruction merging prior to IVR, wherein the bottom-up instruction merging comprises:

merging a bottommost scalar add or subtract operation in the linearly chained series through a preceding instruction; and repeating the merging until the bottommost scalar add or subtract operation is merged through a topmost instruction in the linearly chained series.

6. The method of claim 1, wherein the linearly chained series of eligible operations comprises: composite memory operations having constant values; and scalar add or subtract operations each having one constant operand, and wherein each operation in the linearly chained series directly consumes an output of a preceding operation in the linearly chained series.

7. The method of claim 1, further comprising transforming an operation in the linearly chained series of eligible operations by:

responsive to a determination that the operation is a composite memory operation, setting an offset of the composite memory operation to a new offset equal to an original offset minus an increment value minus a constant operand value; and responsive to determining that the operation is a scalar add or subtract operation, removing the scalar add or subtract operation from the linearly chained series and inserting a new scalar add operation before a first operation in the series.

8. A system for induction variable replacement (IVR), the system comprising:

a storage device that stores program instructions;

one or more processors operably connected to the storage device and configured to execute the program instructions to cause the system to:

identify an IVR candidate in a program loop comprising a linearly chained series of eligible operations, wherein the IVR candidate is a derived induction variable derived from a basic induction variable in the program loop;

convert a composite memory operation that directly uses the IVR candidate to a unified form, wherein offset information and increment information are separated from the composite memory operation;

identifying a scalar add operation that precedes the composite memory operation in the linearly chained series of eligible operations, the scalar add operation having a constant operand; swap constant values associated with the IVR candidate and the scalar add operation;

convert the composite memory operation in the unified form to a composite memory operation having an increment that accommodates the scalar add operation; and move the scalar add operation to a bottommost position within the linearly chained series of eligible operations using instruction merging;

substitute the basic induction variable with the IVR candidate in the program loop;

update a yield value of the program loop based on a control flow resulting from the substitution of the IVR candidate for the basic induction variable;

move a calculation of the basic induction variable outside the program loop; and adjust a result value produced by the program loop such that program behavior prior to IVR is preserved.

9. The system of claim 8, wherein the program instructions to identify the IVR candidate in the program loop further cause the system to:

identify the basic induction variable in the program loop;

determine that the basic induction variable is used by a derived induction variable via the scalar add or subtract operation having a constant operand; and determine that the derived induction variable is used by the composite memory operation eligible for instruction merging.

10. The system of claim 8, wherein the program instructions to move the scalar add operation to the bottommost position within the linearly chained series eligible operations cause the system to:

merge a first scalar add or subtract operation in the linearly chained series of through at least one subsequent instruction; and repeat the merging until the first scalar add or subtract operation is merged through a last instruction in the linearly chained series of eligible operations.

11. The system of claim 8, wherein the program instructions to substitute the basic induction variable with the IVR candidate further cause the system to:

manipulate the IVR candidate to produce an equation equivalent to the basic induction variable;

replace the basic induction variable using the equation; and shift constant terms to a right side of the equation.

12. The system of claim 8, further comprising program instructions to cause the system to execute bottom-up instruction merging prior to IVR, wherein the bottom-up instruction merging causes the system to:

merge a bottommost scalar add or subtract operation in the linearly chained series through a preceding instruction; and repeat the merging until the bottommost scalar add or subtract operation is merged through a topmost instruction in the linearly chained series.

13. The system of claim 8, wherein the program instructions further cause the system to transform an operation in the linearly chained series of eligible operations by:

responsive to a determination that the operation is a composite memory operation, setting an offset of the composite memory operation to a new offset equal to an original offset minus an increment value minus a constant operand value; and responsive to determining that the operation is a scalar add or subtract operation, removing the scalar add or subtract operation from the linearly chained series and inserting a new scalar add operation before a first operation in the linearly chained series.

14. A computer program product for induction variable replacement (IVR), the computer program product comprising:

a persistent storage medium having program instructions configured to cause one or more processors to:

identify an IVR candidate in a program loop comprising a linearly chained series of eligible operations, wherein the IVR candidate is a derived induction variable derived from a basic induction variable in the program loop;

convert a composite memory operation that directly uses the IVR candidate to a unified form, wherein offset information and increment information are separated from the composite memory operation;

identify a scalar add operation that precedes the composite memory operation in the linearly chained series of eligible operations, the scalar add operation having a constant operand; swapping constant values associated with the IVR candidate and the scalar add operation;

convert the composite memory operation in the unified form to a composite memory operation having an increment that accommodates the scalar add operation;

moving the scalar add operation to a bottommost position within the linearly chained series of eligible operations using instruction merging;

substitute the basic induction variable with the IVR candidate in the program loop;

update a yield value of the program loop based on a control flow resulting from the substitution of the IVR candidate for the basic induction variable;

move a calculation of the basic induction variable outside the program loop; and adjust a result value produced by the program loop such that program behavior prior to IVR is preserved.

15. The computer program product of claim 14, wherein the program instructions to identify the IVR candidate in the program loop further cause the processors to:

identify the basic induction variable in the program loop;

determine that the basic induction variable is used by a derived induction variable via a scalar add or subtract operation having a constant operand; and determine that the derived induction variable is used by a composite memory operation eligible for instruction merging.

16. The computer program product of claim 14, wherein the program instructions to move the scalar add operation to the bottommost position within the linearly chained series of eligible operations cause the processors to:

merge a first scalar add or subtract operation in the linearly chained series through at least one subsequent instruction; and repeat the merging until the first scalar add or subtract operation is merged through a last instruction in the linearly chained series of eligible operations.

17. The computer program product of claim 14, wherein the program instructions to substitute the basic induction variable with the IVR candidate further cause the processors to:

manipulate the IVR candidate to produce an equation equivalent to the basic induction variable;

replace the basic induction variable using the equation; and shift constant terms to a right side of the equation.

18. The computer program product of claim 14, further comprising program instructions to cause the processors to execute bottom-up instruction prior to IVR, wherein the bottom-up instruction merging causes the processors to:

merge a bottommost scalar add or subtract operation in the linearly chained series through a preceding instruction; and repeat the merging until the bottommost scalar add or subtract operation is merged through a topmost instruction in the linearly chained series.

19. The computer program product of claim 14, wherein the linearly chained series of eligible operations comprises: composite memory operations having constant values; and scalar add or subtract operations each having one constant operand, and wherein each operation in the linearly chained series directly consumes an output of a preceding operation in the linearly chained series.

20. The computer program product of claim 14, wherein the program instructions further cause the processors to transform an operation in the linearly chained series of eligible operations by:

responsive to a determination that the operation is a composite memory operation, setting an offset of the composite memory operation to a new offset equal to an original offset minus an increment value minus a constant operand value; and responsive to determining that the operation is the scalar add or subtract operation, removing the scalar add or subtract operation from the linearly chained series and inserting a new scalar add operation before a first operation in the series.

* * * * *